United States Patent [19]
Boie

[11] Patent Number: 5,481,311
[45] Date of Patent: Jan. 2, 1996

[54] METHOD AND APPARATUS FOR DIRECTION RELATED INTERPOLATION

[75] Inventor: Werner Boie, Strasbourg, Germany

[73] Assignee: Thomson Consumer Electronics S.A., France

[21] Appl. No.: 33,389

[22] Filed: Mar. 19, 1993

[30] Foreign Application Priority Data

Mar. 20, 1992 [EP] European Pat. Off. ............ 92400762

[51] Int. Cl.$^6$ ........................... H04N 7/01; H04N 5/208
[52] U.S. Cl. .................... 348/448; 348/629; 348/452
[58] Field of Search ................................. 348/448, 452,
348/449–451, 458, 443, 441, 561, 581,
910, 911, 240, 383, 627, 628, 699, 700,
701, 702, 413, 414, 416, 417, 607, 619,
620, 629, 615, 616, 606; 345/136–138;
H04N 7/01, 5/21, 5/208

[56] References Cited

U.S. PATENT DOCUMENTS

| | | | |
|---|---|---|---|
| 4,831,435 | 5/1989 | Song et al. | 348/448 |
| 4,941,045 | 7/1990 | Birch | 348/448 |
| 4,985,764 | 1/1991 | Sato | 358/105 |
| 5,032,899 | 7/1991 | Sato | 348/450 |
| 5,093,721 | 3/1992 | Rabii | 358/135 |
| 5,339,109 | 8/1994 | Hong | 348/448 |

OTHER PUBLICATIONS

Signal Processing of HDTV, Proceedings of the Second International Workshop, 29 Aug. 1989 T. Doyle, pp. 421–430.

*Primary Examiner*—Safet Metjahic
*Attorney, Agent, or Firm*—Joseph S. Tripoli; Peter M. Emanuel; Richard G. Coalter

[57] ABSTRACT

For progressive scan conversion adjacent fields cannot be used to interpolate moving objects because motion blur will be introduced then. The most simple solution is to insert the average of the two adjacent lines for each missing line. A technique superior to vertical averaging represents the DIAG3 algorithm, where according to the found minimum gradient the orientation of the interpolation filter is chosen. But in case of high diagonal frequencies interpolation errors will occur. Therefore it is tested if the reconstructed pixel value exceeds or falls below the pixel values in the two adjacent lines of the input signal. If this happens, instead of one of the detected diagonal directions the vertical direction is taken, it.e. a vertical averaging is carried out.

3 Claims, 4 Drawing Sheets

$1/276\ c/h = 2d$

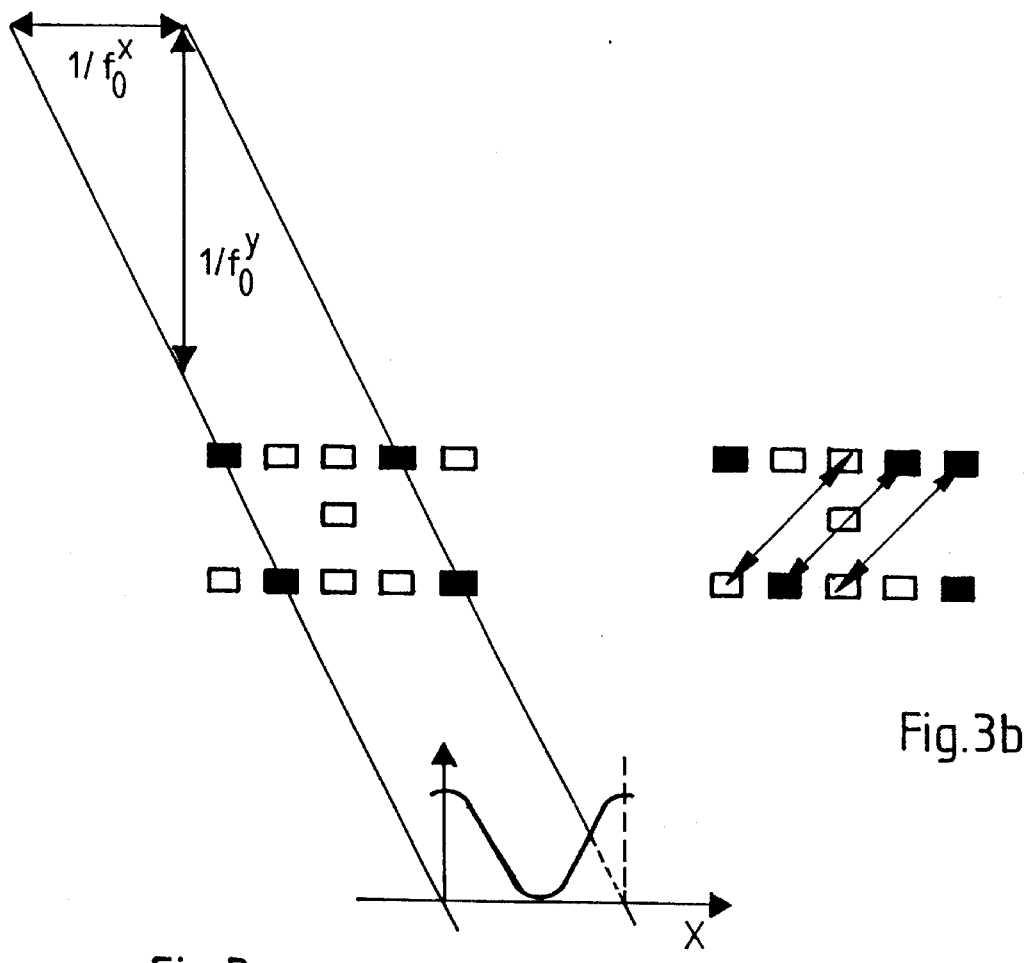
Fig.3a
Fig.3b
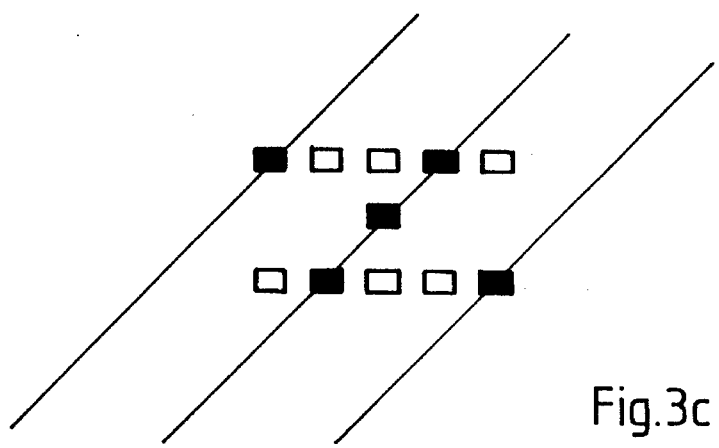
Fig.3c

METHOD AND APPARATUS FOR DIRECTION RELATED INTERPOLATION

FIELD OF THE INVENTION

The present invention relates to a method and to an apparatus for direction related interpolation.

BACKGROUND OF THE INVENTION

Direction related interpolation is useful, for example, for generating additional lines for display in "line doubling" or "progressive scan" video displays. In progressive scan systems adjacent fields cannot be used to interpolate moving objects because motion blur will be introduced then. The most simple solution is to insert the average of the two adjacent lines for each missing line. This is known as vertical averaging and is also called "intra-field" interpolation because the average is based only on picture elements within a field.

A technique superior to vertical averaging represents what will hereinafter be called the "DIAG3" interpolation. An example of this form of interpolation is depicted in FIGS. 1a and 1b herein. Briefly stated, according to the found minimum gradient (absolute value is averaged over three pixels) the orientation of the interpolation filter is chosen. For simplicity of the hardware complexity only the two diagonal and the vertical direction are possible for an interpolation.

In more detail, in FIG. 1a the current pixel 103 is to be interpolated from pixels of the same field of an interlaced input signal, containing the upper adjacent line 101 and the lower adjacent line 102. The interpolation of the current pixel is related to the direction of a structure in the picture content.

As shown in FIG. 1b, three average values for the current pixel are calculated in vertical direction with a first averager 111, in diagonal ascending direction with a second averager 112 and in diagonal descending direction with a third averager 113. Three absolute difference values between adjacent pixel pairs of the two adjacent lines are calculated direction related in the respective branches with first absolute difference value means 121, 131 and 141, with second absolute difference value means 121, 132, and 142 and with third absolute difference value means 123, 133 and 143. The three absolute difference values of each branch are summed in a first adder 151, in a second adder 152 and in a third adder 153, respectively. The minimum of the three sums is detected in a minimum detector 16 and used in a selector 17 to select the average value of the respective branch for forming the current output pixel value 18.

SUMMARY OF THE INVENTION

The present invention resides, in part, in the recognition of a problem with the conventional DIAG3 interpolator described above. Specifically, for reasons based on the kind of orientation detection which is used, the DIAG3 interpolation method can produce some completely wrong structures. From the zone plate test signal interpolated with this method and shown in FIG. 2, it can be concluded that for only ⅝ (dark areas) of the $f^x$, $f^y$ plane the upconverted signal shows a correctly reproduced structure. The maximum correctly interpolated vertical frequency in a 625 line system is 138 c/p (cycles per picture height).

In FIG. 3a it is assumed that the input signal represents a luminance signal with a sinusoidal modulation having a certain spatial frequency of $f^x=f^x0$ and $f^y=f^y0$. For the given example all three differences for the depicted direction in FIG. 3b will become zero. This is obviously not the case in the other two directions. Therefore the wrong direction is chosen for the interpolation. FIG. 3c illustrates the reproduced wrong structure.

A closer look at the reproduced structure in FIG. 4a indicates that the algorithm tries to interpolate a higher vertical frequency component than it is possible in intrafield upconverted pictures, namely $f^y=½*d=276$ c/h, as depicted in FIG. 4b. If one assumes an interlace camera as pick-up device a structure with such a high vertical frequency is subjected to a high attenuation during the scanning process, since the vertical diameter of the camera spot is normally greater than the line distance of a frame. Then the scanned structure will either exhibit a small modulation depth or even disappear, as a consequence.

The present invention is directed to meeting the need for improved direction related interpolation in which the above-described interpolation artifacts are reduced. To this end, a test is performed to determine if the reconstructed pixel value exceeds or falls below the pixel values in the two adjacent lines of the input signal. If this happens, instead of one of the detected diagonal directions the vertical direction is taken, i.e. a vertical averaging is carried out.

In principle the inventive method consists in direction related interpolation of a current pixel, wherein one or more absolute difference values between pixel pairs of lines adjacent to the line of the current pixel are used to detect according to the minimum of said absolute difference values for each of said current pixels at minimum a vertical or a diagonal ascending or a diagonal descending interpolation direction, wherein a) the average value of a respective of said pixel pairs according to said detected interpolation direction is taken as value for said current pixel, if this average value is not greater and not less than the vertical adjacent pixel values of said current pixel, b) the average value of the vertically adjacent pixel pair of said current pixel is taken otherwise.

Direction related interpolation apparatus embodying the invention comprises a first averager for calculating a first average value of a pixel pair in vertical direction, a second averager for calculating a second average value of a pixel pair in diagonal ascending direction and a third averager for calculating a third average value of a pixel pair in diagonal descending direction, and comprising absolute difference value calculating means for the respective pixel pair and respective adjacent pixel pairs according to said direction, wherein the outputs of said absolute difference value calculating means are summed in respective adders within each branch and the minimum of said sums is detected in a minimum detector and used in a selector to select according to said minimum the respective one of said average values, and wherein a first comparator circuit determines the maximum and the minimum value of the two pixels vertically adjacent to said current pixel and said average value is compared in a second comparator circuit with the minimum and maximum value found in said first comparator and a) if said average value is greater than the maximum value or less than the minimum value a switch connects the output of said first averager to deliver said current output pixel value;

b) the output of said selector is connected to deliver said current output pixel value, otherwise.

IN THE DRAWING

The invention is illustrated in the accompanying drawing wherein like elements are denoted by like reference elements, and in which:

FIG. 1b is a block diagram of a known direction responsive interpolator using the pixed array of FIG. 1a;

FIGS. 3a, 3b and 3c illustrate pixed array values for a sine wave modulated diagonal line;

DETAILED DESCRIPTION

Figure 1B:
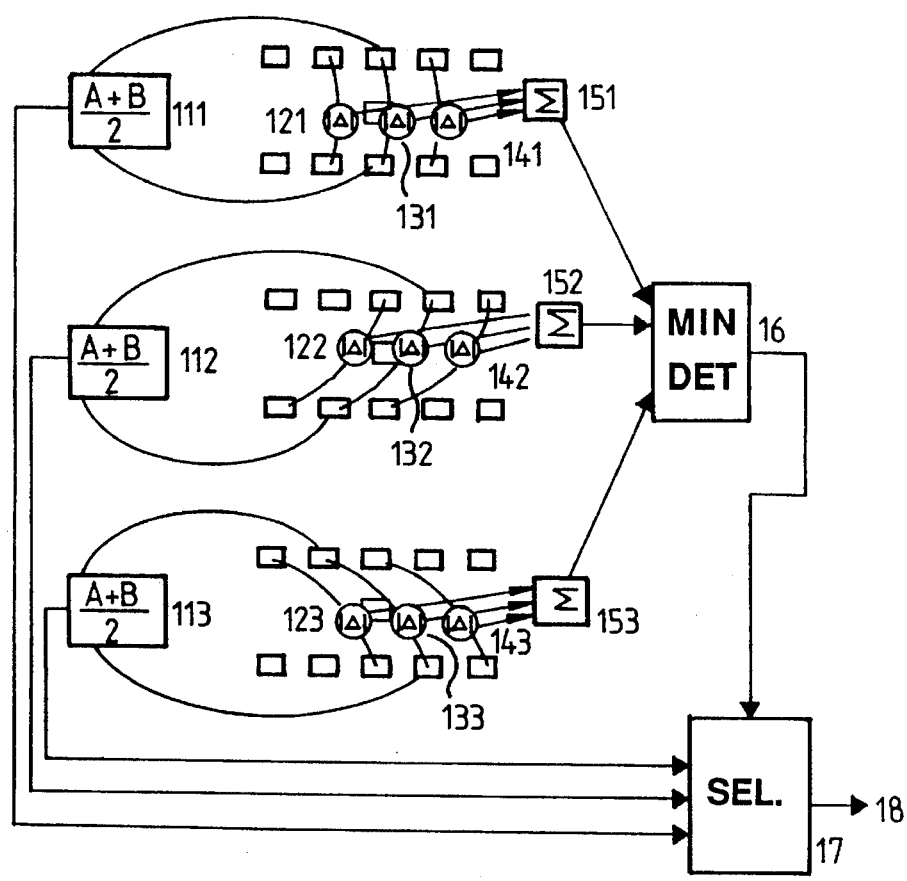
Figure 1A:
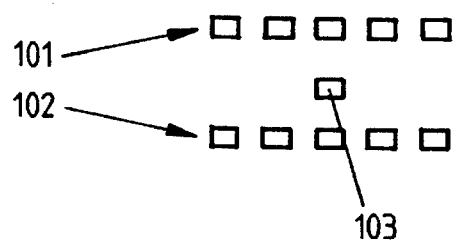
FIG. 1a illustrates the topology of a pixed array used for interpolation.
Figure 4A:
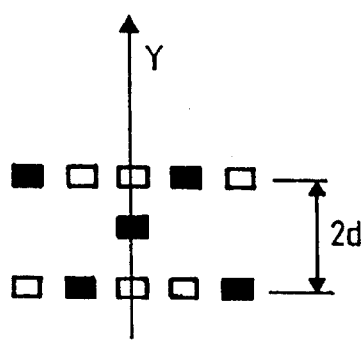
FIGS. 4a and 4b are pixel patterns for a vertical frequency of 1/276 c/h.
Figure 4B:
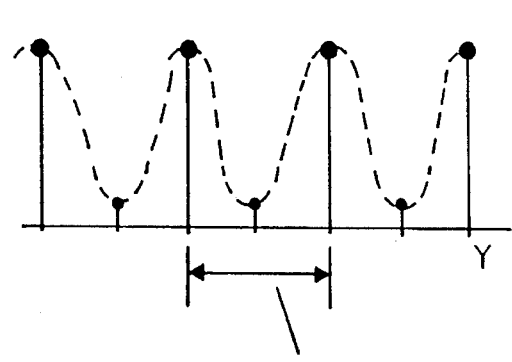
Figure 2:
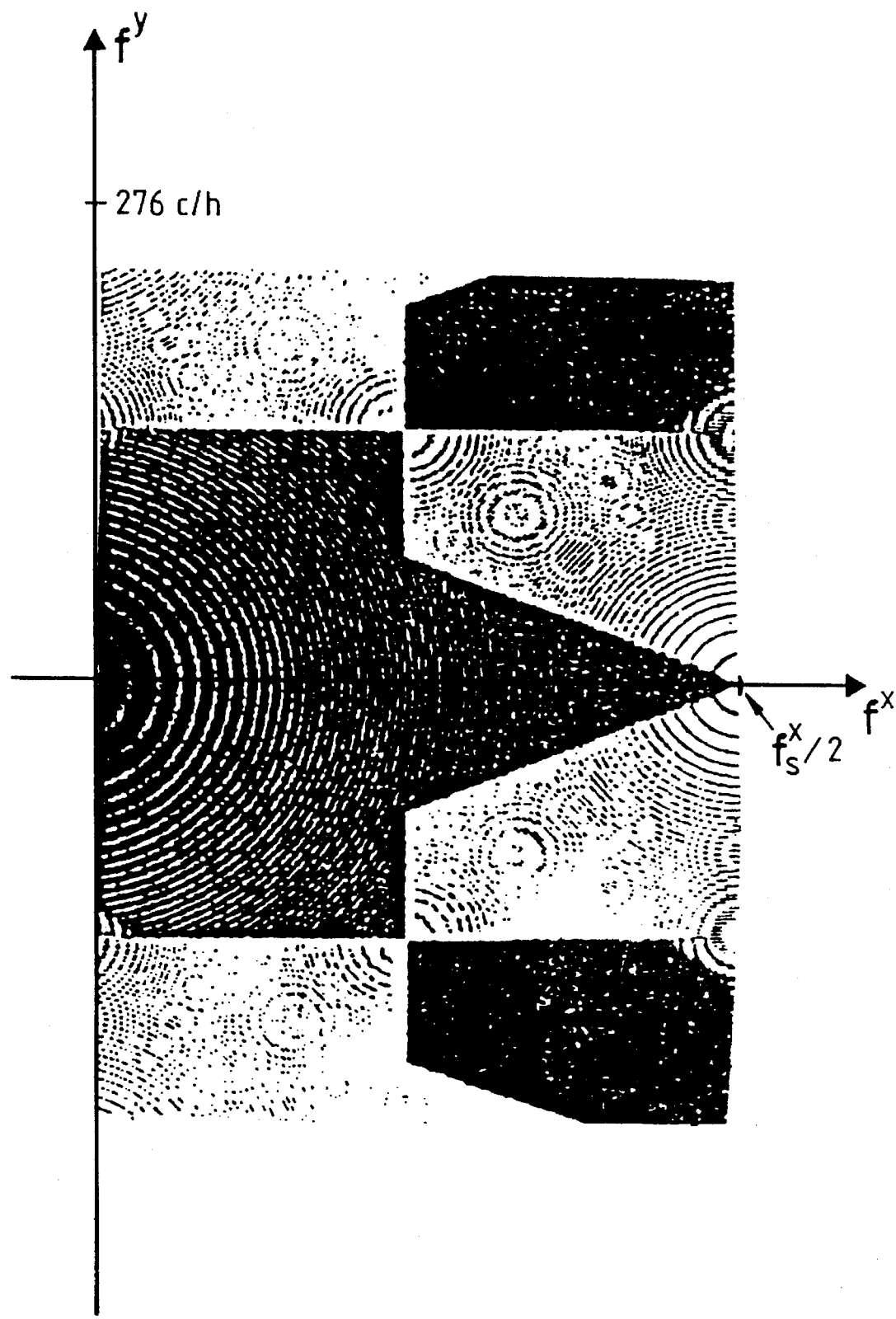
FIG. 2 is a zone plate test pattern illustrating alias effects for the interpolator of FIG. 1b.
Figure 5:
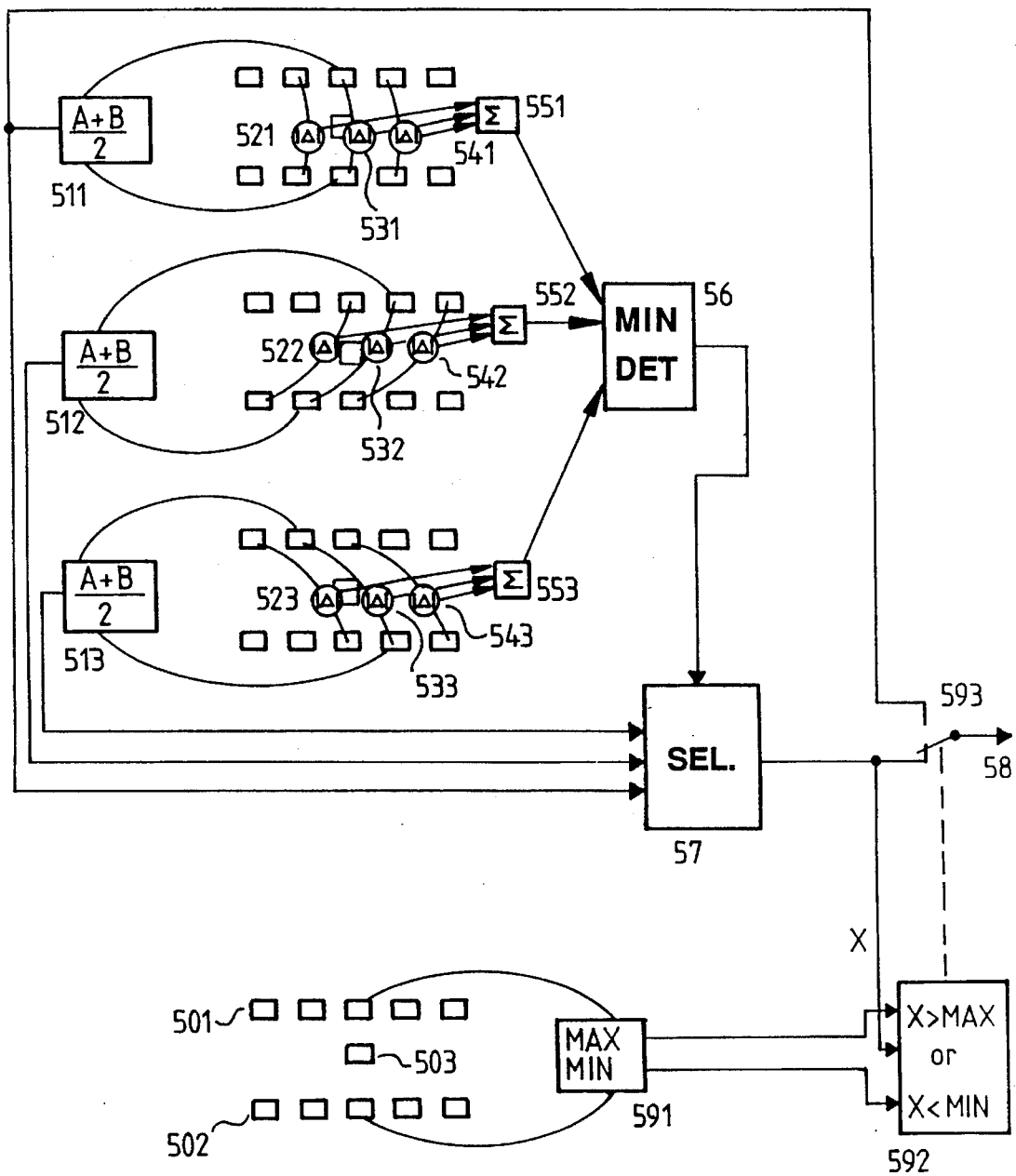
FIG. 5 is a block diagram of a direction related interpolator embodying the invention.

In FIG. 5 the current pixel 503 is to be interpolated from the pixels of the same field of an interlaced input signal, containing the upper adjacent line 501 and the lower adjacent line 502. The interpolation of the current pixel is related to the direction of the structure in the picture content. Three average values for the current pixel 503 are calculated in vertical direction with a first averager 511, in diagonal ascending direction with a second averager 512 and in diagonal descending direction with a third averager 513. Three absolute difference values between adjacent pixel pairs of the two adjacent lines are calculated direction related in the respective branches with first absolute difference value means 521, 531 and 541, with second absolute difference value means 521, 532 and 542 and with third absolute difference value means 523, 533 and 543. The three absolute difference values of each branch are summed in a first adder 551, in a second adder 552 and in a third adder 553, respectively. The minimum of the three sums is detected in a minimum detector 56 and used in a selector 57 to select the average value X of the respective branch.

A first comparator circuit 591 determines the maximum and the minimum value of the two pixels vertically adjacent to the current pixel 503. The average value X is compared in a second comparator circuit 592 with the minimum and maximum value found in the first comparator. If X is greater than the maximum value or if X is less than the minimum value switch 593 connects the output of first averager 511 to output 58. Otherwise the output of selector 57 is connected to output 58 which delivers the current pixel value.

What is claimed is:

1. A method for direction related interpolation of a current pixel of a video input signal to form an interpolated video output signal for display with reduced visual artifacts due to direction related interpolation errors, wherein one or more absolute difference values between pixel pairs of horizontal lines adjacent to the line of a current pixel of said video input signal are used to detect according to the minimum of said absolute difference values for said current pixel at least a vertical or a diagonal ascending or a diagonal descending interpolation direction, wherein, for reducing said direction related visual artifacts, the method further comprises the steps of:

a) selecting the average value of a respective one of said pixel pairs according to said detected interpolation direction as the value for said current pixel of said interpolated video output signal, if this average value is not greater and not less than the values of the vertically adjacent pixel pair of said current pixel and;

b) selecting the average value of the vertically adjacent pixel pair of said current pixel as the value for said current pixel otherwise for forming said interpolated video output signal.

2. Method according to claim 1, further comprising:

comparing the average value with pixel values adjacent to said vertically adjacent pixels.

3. Apparatus for providing direction related interpolation of a current pixel of a video input signal with reduced visual artifacts, comprising:

a first averager for calculating a first average value of a pixel pair vertically adjacent to said current pixel (in vertical direction,);

a second averager for calculating a second average value of a pixel pair in diagonal ascending direction with respect to said current pixel;

a third averager for calculating a third average value of a pixel pair in diagonal descending direction with respect to said current pixel absolute difference value calculating means for the vertically adjacent pixel pair and respective adjacent pixel pairs according to said directions, wherein:

the outputs of said absolute difference value calculating means are summed in respective adders within each branch and the minimum of said sums is detected in a minimum detector and used in a selector to select according to said minimum the respective one of the averager output values, and wherein, for reducing a tendency for direction related interpolation errors to produce visual artifacts, said apparatus further comprises:

a first comparator circuit, having inputs coupled to receive said video input signal for determining the maximum value and the minimum value of the two pixels vertically adjacent to said current pixel and a second comparator having inputs coupled to receive said maximum and minimum values provided by said first comparator and having an input coupled to an output of said selector, the selector output value being compared in said second comparator circuit with the minimum value and the maximum value found in said first comparator and a) if said selector output value is greater than the maximum value or less than the minimum value a switch connects the output of said first averager to an interpolator output to deliver said current output pixel value;

b) the output of said selector being connected via said switch to deliver said current output pixel value, otherwise.

* * * * *